United States Patent
Hoashi et al.

(10) Patent No.: US 12,232,027 B2
(45) Date of Patent: Feb. 18, 2025

(54) CONTROL METHOD

(71) Applicant: Panasonic Intellectual Property Management Co., Ltd., Osaka (JP)

(72) Inventors: Masakazu Hoashi, Shiga (JP); Kazuhiro Murakami, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 357 days.

(21) Appl. No.: 17/737,454

(22) Filed: May 5, 2022

(65) Prior Publication Data

US 2022/0264446 A1 Aug. 18, 2022

Related U.S. Application Data

(63) Continuation of application No. 16/636,562, filed as application No. PCT/JP2019/035644 on Sep. 11, 2019, now Pat. No. 11,363,525.

(30) Foreign Application Priority Data

Sep. 18, 2018 (JP) ................................ 2018-173176

(51) Int. Cl.
*H04W 48/20* (2009.01)
*F25D 29/00* (2006.01)
(Continued)

(52) U.S. Cl.
CPC .......... *H04W 48/20* (2013.01); *F25D 29/005* (2013.01); *H04W 12/06* (2013.01); *H04W 48/16* (2013.01);
(Continued)

(58) Field of Classification Search
CPC ..... H04W 48/20; H04W 48/16; H04W 12/06; H04W 76/10; H04W 84/12; H04W 92/08;
(Continued)

(56) References Cited

U.S. PATENT DOCUMENTS

2011/0235549 A1 9/2011 Ahlers et al.
2014/0176980 A1 6/2014 Asai
(Continued)

FOREIGN PATENT DOCUMENTS

CN 106209537 A * 12/2016
CN 107465586 12/2017
(Continued)

OTHER PUBLICATIONS

"How-To Geek—How to Set Up Your Wi-Fi Connected Roomba", By Panasonic System Networks Co., Ltd., dated Feb. 2, 2017, 1-19 pages (Year: 2017).*
(Continued)

*Primary Examiner* — Farid Seyedvosoghi
(74) *Attorney, Agent, or Firm* — HSML P.C.

(57) ABSTRACT

A control method that is achieved by a refrigerator application installed in portable terminal (110), the control method including the steps of instructing an operating system (OS) of portable terminal (110) to connect to a refrigerator in operation in a software access point mode, and sending a service set identifier (SSID) of an access point and a password for connecting to the access point to the refrigerator. An SSID of the refrigerator that operates in the software access point mode, and a password for connecting to the refrigerator that operates in the software access point mode are incorporated in the refrigerator application in advance.

4 Claims, 14 Drawing Sheets

(51) Int. Cl.
*H04W 12/06* (2021.01)
*H04W 48/16* (2009.01)
*H04W 76/10* (2018.01)
*H04W 84/12* (2009.01)
*H04W 92/08* (2009.01)

(52) U.S. Cl.
CPC ........... *H04W 76/10* (2018.02); *H04W 84/12* (2013.01); *H04W 92/08* (2013.01); *F25D 2400/361* (2013.01)

(58) Field of Classification Search
CPC ....... H04W 4/50; H04W 24/02; H04W 88/08; F25D 29/005; F25D 29/00; F25D 2400/361; H04L 63/083; H04L 67/12; H04M 1/72415
See application file for complete search history.

(56) References Cited

U.S. PATENT DOCUMENTS

| | | | |
|---|---|---|---|
| 2014/0362841 A1* | 12/2014 | Shibata | H04W 48/18 370/338 |
| 2015/0139025 A1 | 5/2015 | Lee et al. | |
| 2016/0249281 A1 | 8/2016 | Sahni | |
| 2017/0055150 A1 | 2/2017 | Hou et al. | |
| 2017/0286134 A1 | 10/2017 | Sumiuchi et al. | |
| 2018/0042056 A1 | 2/2018 | Hosoda | |
| 2018/0101377 A1 | 4/2018 | Wingate, Jr. et al. | |
| 2018/0234500 A1 | 8/2018 | Aso | |
| 2018/0242378 A1 | 8/2018 | Suzuki et al. | |
| 2018/0324684 A1 | 11/2018 | Onohara et al. | |

FOREIGN PATENT DOCUMENTS

| | | | | |
|---|---|---|---|---|
| JP | 2003230184 A | * | 8/2003 | ......... H04L 12/2803 |
| JP | 2005-033285 | | 2/2005 | |
| JP | 2014-060623 | | 4/2014 | |
| JP | 2014-241487 A | | 12/2014 | |
| JP | 2017-528928 | | 9/2017 | |
| JP | 2017-212504 | | 11/2017 | |
| JP | 2018-129747 | | 8/2018 | |
| KR | 2018034014 | | 4/2018 | |
| WO | 2017/110035 | | 6/2017 | |

OTHER PUBLICATIONS

English Translation of Chinese Search Report dated Feb. 22, 2023 for the related Chinese Patent Application No. 201980003827.9, 3 pages.

The EPC Office Action dated Jul. 4, 2023 for the related European Patent Application No. 19845692.3.

Ravenscraft Eric: "We How-To Geek How to Set Up Your Wi-Fi Connected Roomba",, Aug. 17, 2017 (Aug. 17, 2017), XP093057763, Retrieved from the Internet: URL:https://www.howtogeek.com/322060/how-to-set-up-your-wi-ficonnected-roomba/ [retrieved on Jun. 26, 2023], 19 pages.

International Search Report issued in International Application No. PCT/JP2019/035644, Nov. 5, 2019, 9 pages.

The Extended European Search Report dated Oct. 8, 2021 for the related European Patent Application No. 19845692.3.

WirelessTech: "How to Set Up Your Wi Fi Connected Roomba", Youtube, Aug. 18, 2017 (Aug. 18, 2017), p. 5 pp., XP054982298. https://www.youtube.com/watch?v=K0xxKvgy2Gg.

Home Connect: "Connect your oven to the future", 9001, Oct. 9, 2015(Oct. 9, 2015), pp. 1-12, XP055492762. https://www.home-connect.com/media/content/downloads/installation_guide/en/Installation_guide_PCG_Bosch_en.pdf.

"Connect your refrigerator—to the future" by Home Connect, Jun. 3, 2016, 12 pages.

"Smart Air Conditioner User Manual", version A by Toshiba, Jul. 2018, 24 pages.

"FAQ Home Network System", Panasonic System Networks Co., Ltd, Feb. 2, 2017, 68 pages.

"Smart Humidifier User's Guide" for Model: MBP86SN by Motorola, Aug. 9, 2017, 40 pages.

\* cited by examiner

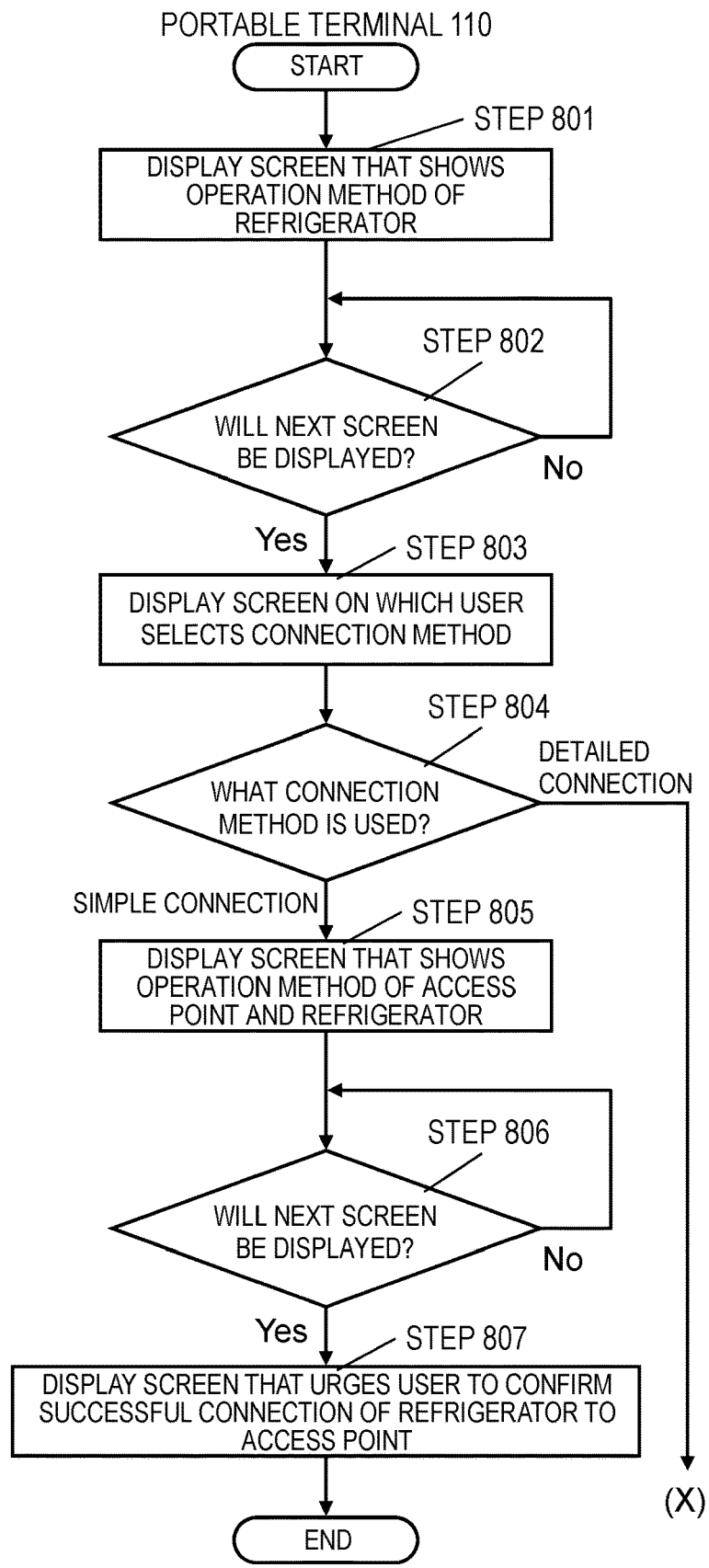

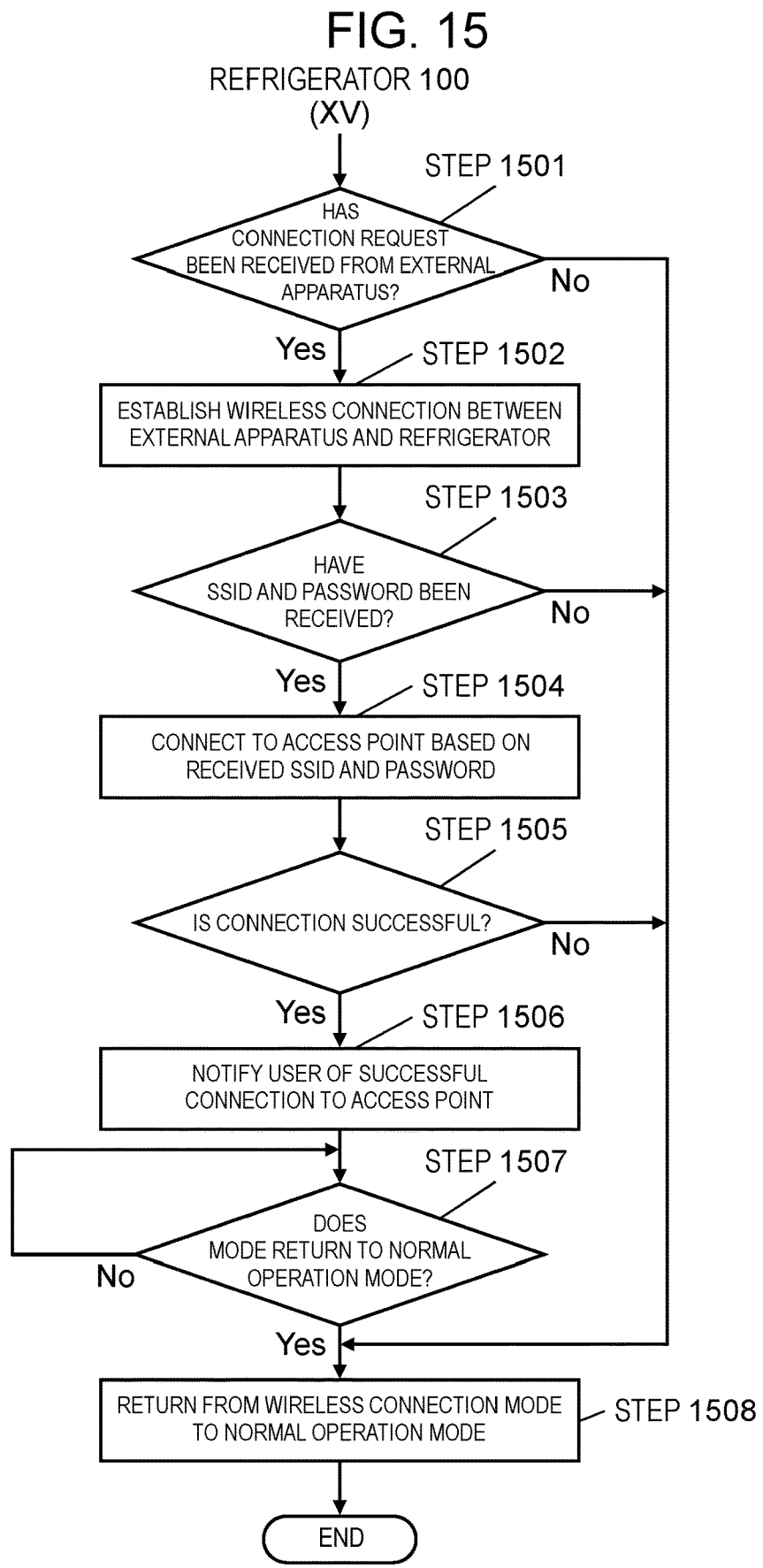

CONTROL METHOD

TECHNICAL FIELD

The present disclosure relates to a control method in a portable terminal.

BACKGROUND ART

PTL 1 discloses a communication device that displays a service set identifier (SSID) of a peripheral access point, strength of a reception field intensity, and congestion information. Through a selection of a desired access point from displayed access points by a user, a wireless connection is established between the communication device and the access point selected by the user.

As in PTL 1, as a method for establishing a wireless connection between a communication device and an access point, a method is common in which the communication device searches for a peripheral access point and displays a search result, and then a user specifies an access point of a connection destination from the search result. However, a communication device that does not include a display in a first place exists. Moreover, a communication device exists that is difficult to use, even when including some sort of display device for a purpose of specifying an access point of a connection destination by the user.

CITATION LIST

Patent Literature

PTL 1: Unexamined Japanese Patent Publication No. 2005-033285

SUMMARY OF THE INVENTION

The present disclosure provides a mechanism in which, even when a user does not specify an access point of a connection destination of a communication device in the communication device, a wireless connection can be established between the communication device and the access point.

The control method according to an aspect of the present disclosure is a control method that is achieved by an application installed in a portable terminal, the control method including the steps of instructing an operating system (OS) of the portable terminal to connect to a communication device in operation in a software access point mode, and sending a service set identifier (SSID) of an access point and a password for connecting to the access point to the communication device. An SSID of the communication device that operates in the software access point mode, and a password for connecting to the communication device that operates in the software access point mode are incorporated in the application in advance.

Moreover, the control method according to another aspect of the present disclosure is a control method that is achieved by a refrigerator application installed in a portable terminal, the control method including the steps of instructing an operating system (OS) of the portable terminal to connect to a refrigerator in operation in a software access point mode, and sending a service set identifier (SSID) of an access point and a password for connecting to the access point to the refrigerator. An SSID of the refrigerator that operates in the software access point mode, and a password for connecting to the refrigerator that operates in the software access point mode are incorporated in the refrigerator application in advance.

BRIEF DESCRIPTION OF DRAWINGS

FIG. 8 is a flowchart showing processing executed by portable terminal 110.
FIG. 15 is a flowchart showing processing executed by refrigerator 100.

DESCRIPTION OF EMBODIMENT

Figure 1:
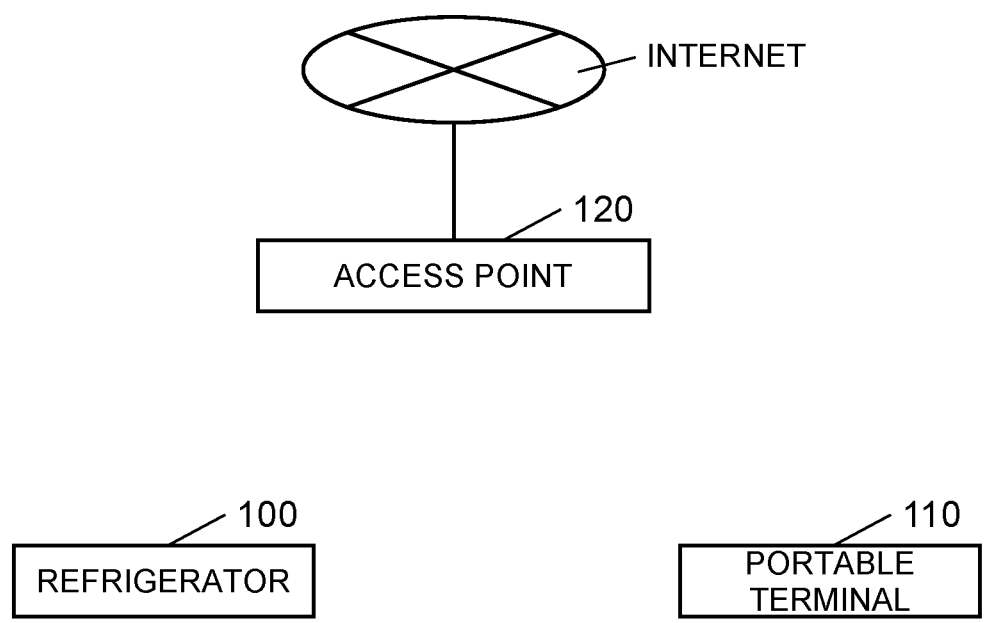
FIG. 1 is a diagram showing an outline of a system.

The control method according to an aspect of the present disclosure is a control method that is achieved by an application installed in a portable terminal, the control method including the steps of instructing an operating system (OS) of the portable terminal to connect to a communication device in operation in a software access point mode, and sending a service set identifier (SSID) of an access point and a password for connecting to the access point to the communication device. An SSID of the communication device that operates in the software access point mode, and a password for connecting to the communication device that operates in the software access point mode are incorporated in the application in advance.

This control method may include the steps of acquiring the SSID of the access point that is connected the portable terminal from the OS, and receiving an input of the password for connecting to the access point from a user. In the step of sending, the SSID acquired in the step of acquiring and the password received in the step of receiving may be sent to the communication device.

In this control method, based on reception of a specified operation from the user, the step of instructing may be executed.

This control method may include a step of displaying a screen that urges the user to operate the communication device in the software access point mode. The specified operation may be an operation that is input by the user in response to the screen and indicates proceeding to a next process.

In this control method, the screen may be a screen that urges the user to press a specific button of the communication device to operate the communication device in the software access point mode.

The control method according to another aspect of the present disclosure is a control method that is achieved by a refrigerator application installed in a portable terminal, the control method including the steps of instructing an OS of the portable terminal to connect to a refrigerator in operation in a software access point mode, and sending an SSID of an access point and a password for connecting to the access point to the refrigerator. An SSID of the refrigerator that operates in the software access point mode, and a password for connecting to the refrigerator that operates in the software access point mode are incorporated in the refrigerator application in advance.

This control method may include the steps of acquiring the SSID of the access point that is connected the portable terminal from the OS, and receiving an input of the password for connecting to the access point from a user. In the step of sending, the SSID acquired in the step of acquiring and the password received in the step of receiving may be sent to the refrigerator.

In this control method, based on reception of a specified operation from a user, the instructing step may be executed.

This control method may include a step of displaying a screen that urges the user to operate the refrigerator in the software access point mode. The specified operation may be an operation that is input by the user in response to the screen and indicates proceeding to a next process.

In this control method, the screen may be a screen that urges the user to press a specific button of the refrigerator to operate the refrigerator in the software access point mode.

In this control method, the specific button may be provided inside the refrigerator.

An exemplary embodiment of the present disclosure will be described below with reference to the accompanying drawings. The exemplary embodiment below is not intended to limit the invention according to the scope of the claims. Also, all combinations of the characteristics described in the exemplary embodiment are not necessarily essential for solving the problems by the invention.

Exemplary Embodiment

FIG. 1 is a diagram showing an outline of a system of the present exemplary embodiment. The system of the present exemplary embodiment is configured of refrigerator 100, portable terminal 110, and access point 120. Refrigerator 100 is an example of the communication device, and, according to connection procedures described later, establishes a wireless connection between refrigerator 100 and access point 120 and communicates with a server on the internet. Access point 120 is, for example, a wireless local area network (LAN) router. Portable terminal 110 is, for example, a smartphone or a tablet terminal. Portable terminal 110 establishes a wireless connection between portable terminal 110 and access point 120 and communicates with a server on the Internet.

Figure 2:
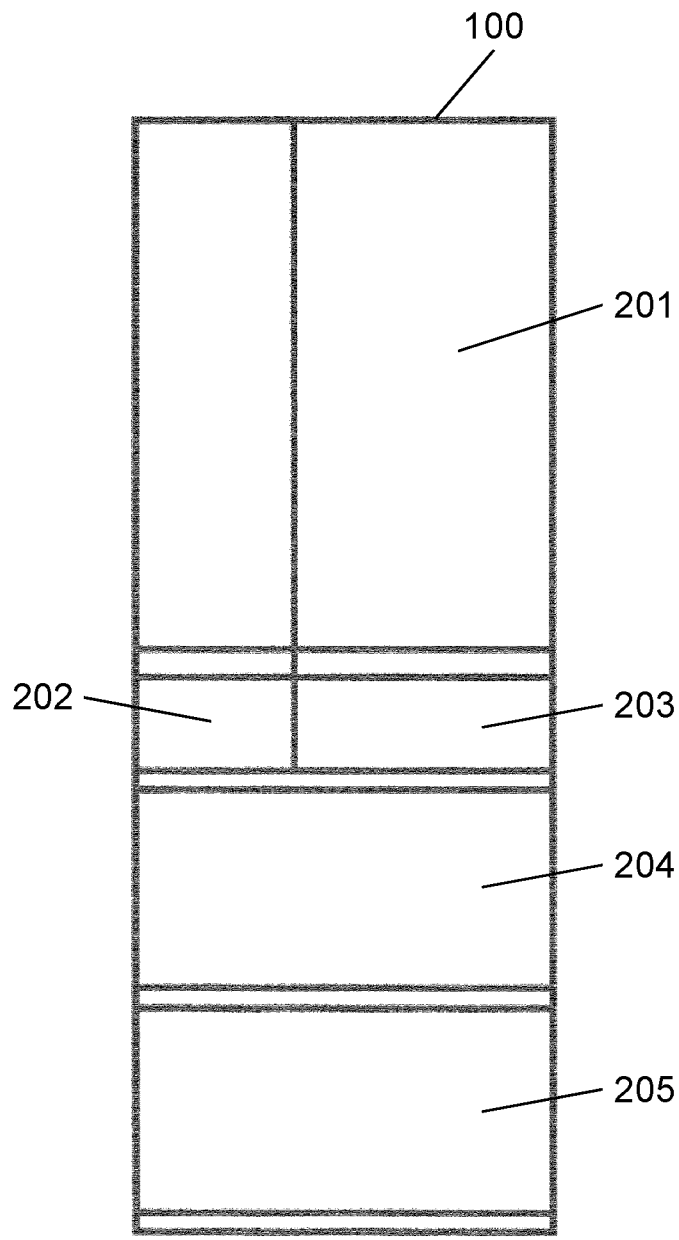
FIG. 2 is an external view of refrigerator 100.

FIG. 2 is an external view of refrigerator 100. Refrigerator 100 includes a plurality of storage compartments, specifically, refrigerating chamber 201, ice-making chamber 202, upper freezing chamber 203, lower freezing chamber 204, and vegetable chamber 205. Moreover, a partial/chilled switching chamber is provided inside refrigerating chamber 201.

Figure 3:
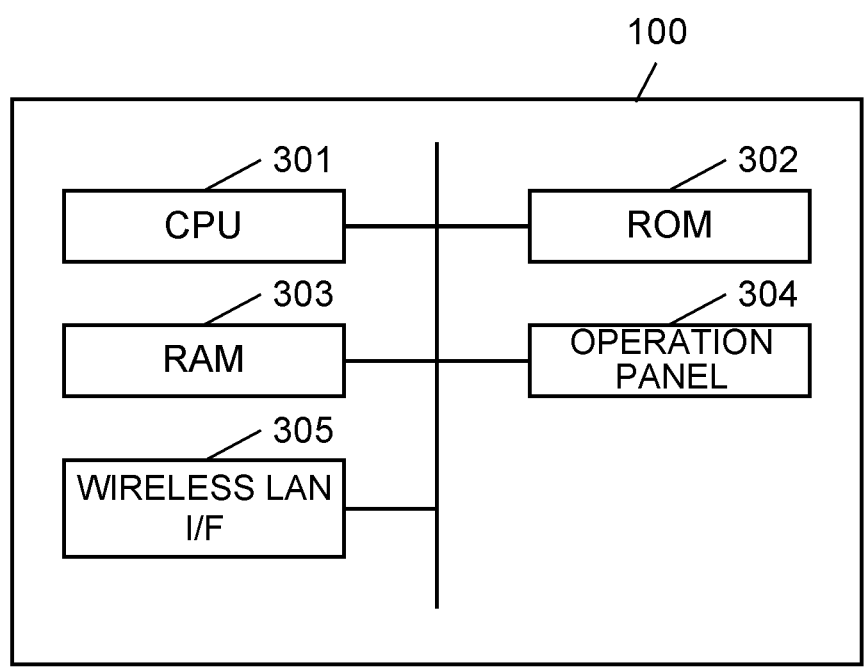
FIG. 3 is a diagram showing a hardware configuration of refrigerator 100.

FIG. 3 is a diagram showing a hardware configuration of refrigerator 100. Central processing unit (CPU) 301 is a processor that reads a control program stored in read only memory (ROM) 302, and executes various kinds of processing for controlling an operation of refrigerator 100. ROM 302 is a nonvolatile storage medium that stores various types of data such as a control program. Random access memory (RAM) 303 is a volatile storage medium that is used as a temporary storage area. Instead of CPU 301, ROM 302, and RAM 303, a microcontroller may be included to control the operation of refrigerator 100.

Operation panel 304 receives an operation of the user for refrigerator 100. Operation panel 304 will be described in detail later with reference to FIG. 5.

Figure 4:
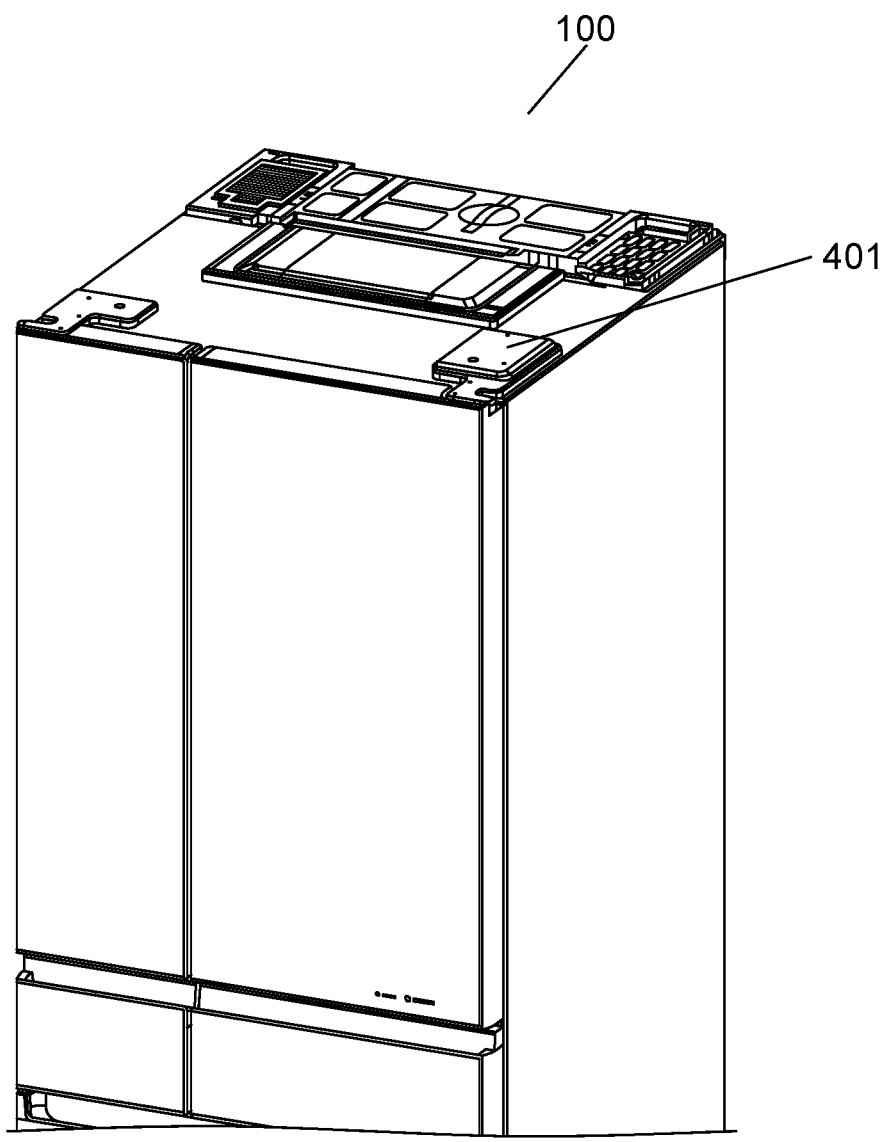
FIG. 4 is a view showing hinge cover 401 of refrigerator 100.

Wireless LAN interface (I/F) 305 executes a wireless LAN communication based on a specification such as IEEE802.11a/b/g/n/ac. As shown in FIG. 4, wireless LAN I/F 305 is stored inside hinge cover 401 of a door that closes refrigerating chamber 201.

Wireless LAN I/F 305 establishes a wireless connection between wireless LAN I/F 305 and access point 120 (see FIG. 1) and communicates with a server on the Internet. Moreover, refrigerator 100 can be operated in a software access point mode (in the description below, referred to as a soft AP mode). In the soft AP mode, refrigerator 100 operates as an access point of the wireless LAN. In a case where refrigerator 100 operates in the soft AP mode, a wireless connection is established between portable terminal 110 and wireless LAN I/F 305, and without using a relay apparatus such as access point 120, portable terminal 110 and refrigerator 100 directly execute a wireless LAN communication.

Although not shown in FIG. 3, refrigerator 100 includes a refrigeration cycle that is configured of a compressor, a condenser, a cooler, and the like. Cool air generated by the cooler cools each of the storage compartments such as refrigerating chamber 201 in a predetermined temperature zone.

Figure 5:
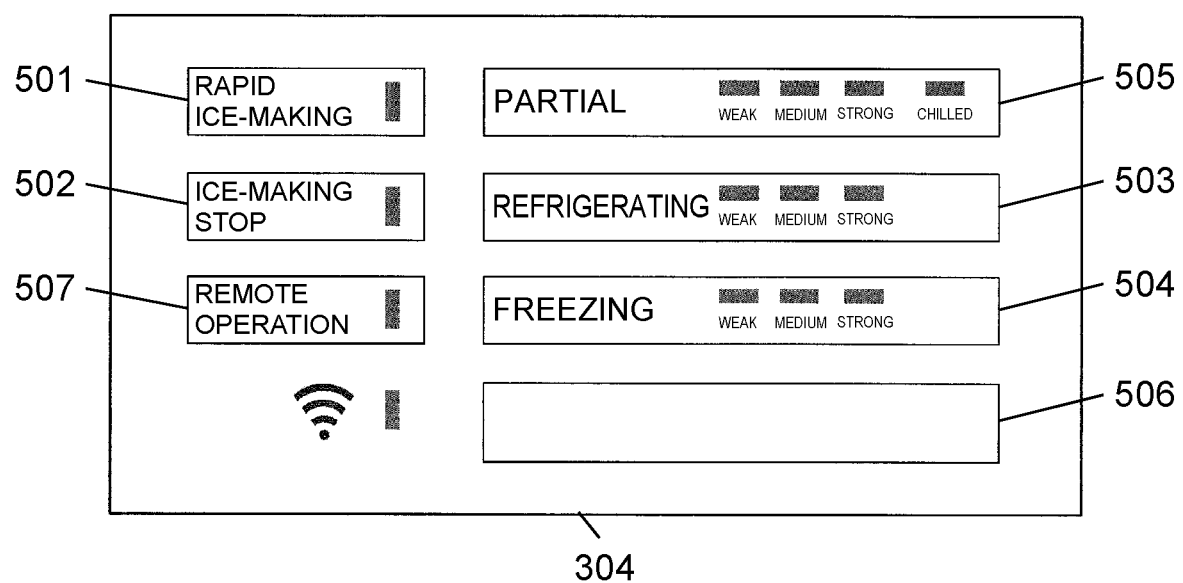
FIG. 5 is a view showing operation panel 304.

FIG. 5 is a view showing operation panel 304. Operation panel 304 is provided on a side wall inside refrigerating chamber 201 (see FIG. 2). Rapid ice-making button 501 is a button for instructing refrigerator 100 to rapidly make ice. Ice-making stop button 502 is a button for instructing refrigerator 100 to stop making ice. Refrigerating button 503 and freezing button 504 are buttons for adjusting a temperature of refrigerating chamber 201 and the temperature of lower freezing chamber 204, respectively. Partial button 505 is a button for adjusting the temperature of the partial/chilled switching chamber. Display 506 displays information such as an error code.

Next, remote operation button 507 will be described. When the user presses remote operation button 507 while a remote operation setting of refrigerator 100 is turned off (OFF), the remote operation setting is turned on. When the remote operation setting is turned on (ON), a setting of refrigerator 100 can be changed by an instruction from refrigerator application 702 (see FIG. 7) described later. On the other hand, when the user presses remote operation button 507 while the remote operation setting is ON, the remote operation setting is turned OFF. When the remote operation setting is OFF, the setting of refrigerator 100 cannot be changed by the instruction of refrigerator application 702 described later.

Moreover, when the user presses and holds remote operation button 507 for a predetermined time (for example, 3 seconds) or longer while the remote operation setting is ON, not only the remote operation setting is turned OFF, but also power supply to wireless LAN I/F 305 is shut off. The shut-off of the power supply to wireless LAN I/F 305 can reduce power consumption of refrigerator 100. When the user presses remote operation button 507 while the remote operation setting is OFF and the power supply to wireless LAN I/F 305 is shut off, the remote operation setting is turned ON and power supply to wireless LAN I/F 305 starts.

Figure 6:
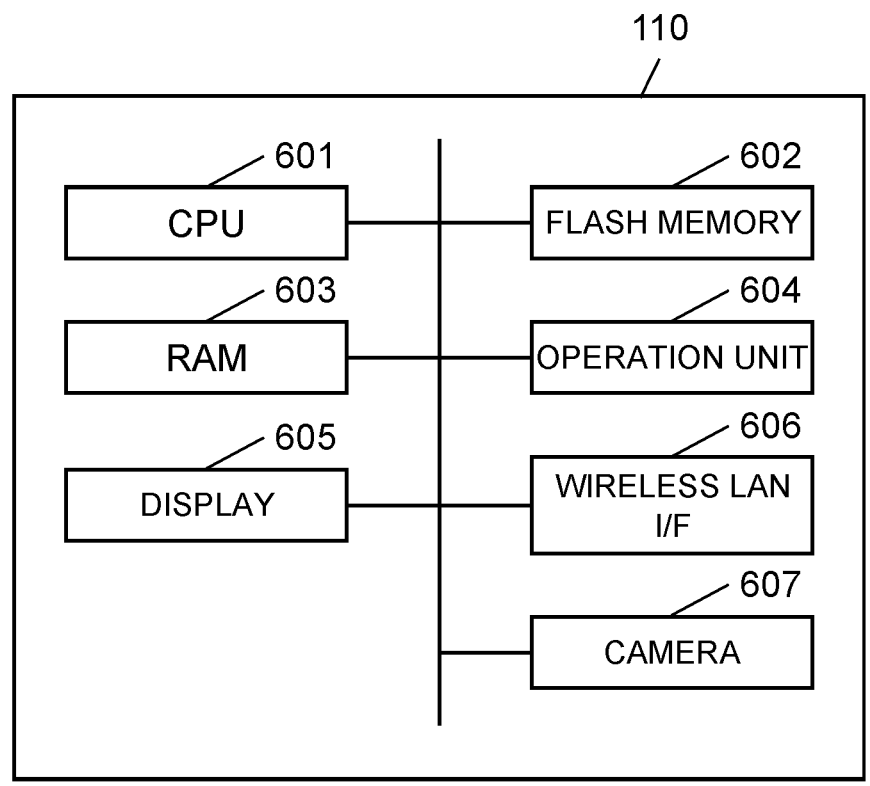
FIG. 6 is a diagram showing a hardware configuration of portable terminal 110.

FIG. 6 is a diagram showing a hardware configuration of portable terminal 110. CPU 601 is a processor that reads a control program stored in flash memory 602 and executes various kinds of processing for controlling an operation of portable terminal 110. Flash memory 602 is a nonvolatile storage medium that stores various types of data such as a control program, and a program of an application installed in portable terminal 110. RAM 603 is a volatile storage medium that is used as a temporary storage area. Operation unit 604 is a key and a plurality of keys are provided in portable terminal 110. Display 605 is a touch panel that displays information such as an image or a moving image, and receives an instruction from the user through a touch operation. Wireless LAN I/F 606 executes a wireless LAN communication such as IEEE802.11a/b/g/n/ac. Wireless LAN I/F 606 establishes a wireless connection between wireless LAN I/F 606 and access point 120 (see FIG. 1) and communicates with a server on the Internet. Camera 607 has a photographing function and a reading function that reads a two-dimensional code such as a QR code (registered trademark).

Figure 7:
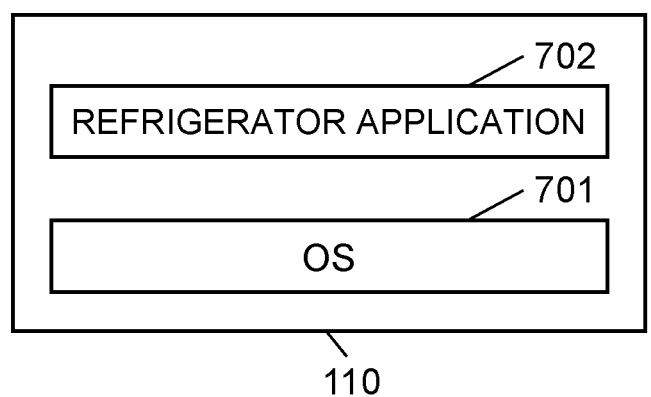
FIG. 7 is a diagram showing a software configuration of portable terminal 110.

Next, a software configuration of portable terminal 110 will be described with reference to FIG. 7. FIG. 7 is a functional block diagram of software that is achieved through reading of the control program, application program, and the like stored in flash memory 602 by CPU 601 (see FIG. 6).

Operating system (OS) 701 is basic software for controlling an overall operation of portable terminal 110, and is achieved through reading of the control program by CPU 601 (see FIG. 6). Moreover, various applications can be installed in portable terminal 110. OS 701 exchanges information with these applications, and controls the operation of portable terminal 110 according to an instruction received from the applications.

Refrigerator application 702 is one of the applications installed in portable terminal 110. Refrigerator application 702 is an application provided for the refrigerator to the user. Refrigerator application 702 is configured to change the setting of refrigerator 100 from refrigerator application 702, and display a notification (for example, a notification that indicates completion of ice-making) sent by refrigerator 100 on portable terminal 110. In flash memory 602 (see FIG. 6), a refrigerator application program for achieving refrigerator application 702 is stored. Refrigerator application 702 is achieved through reading of the refrigerator application program by CPU 601 (see FIG. 6).

Next, the procedure for establishing a wireless connection between refrigerator 100 (see FIG. 1) and access point 120 (see FIG. 1) with reference to FIGS. 8 to 15. The user follows a guide screen provided by refrigerator application 702 (see FIG. 7) to connect refrigerator 100 to access point 120.

Figure 12:
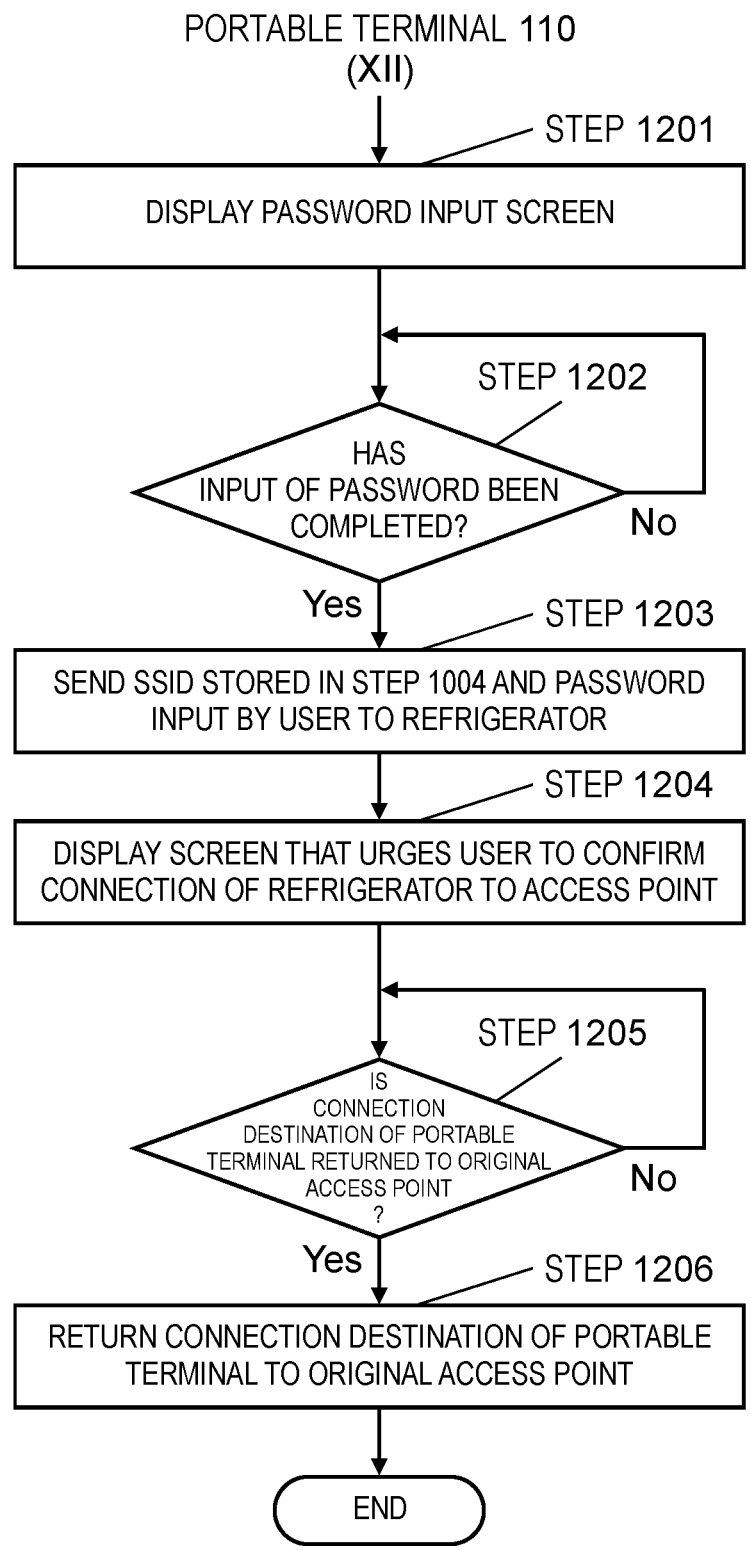
FIG. 12 is a flowchart showing processing executed by portable terminal 110.
Figure 13A:
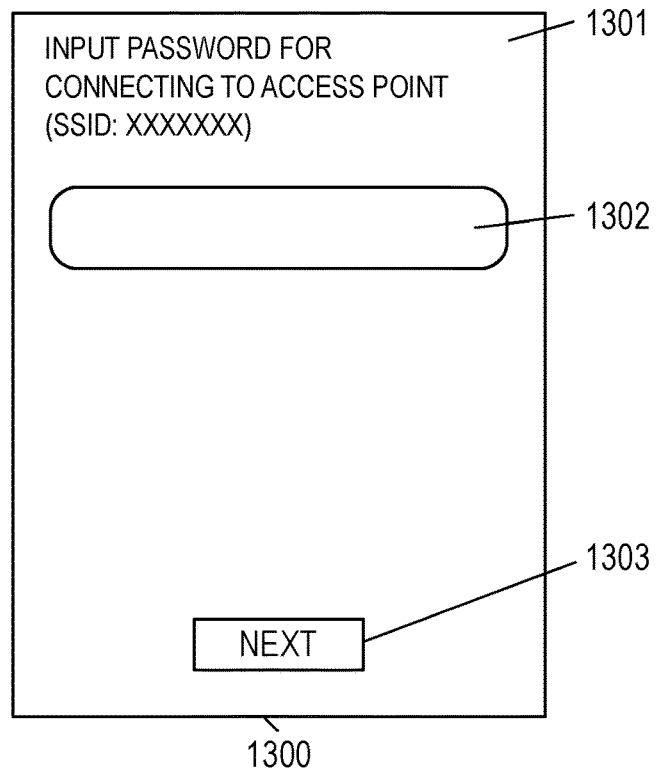
FIG. 13A is a view showing a password input screen displayed by portable terminal 110.
Figure 13B:
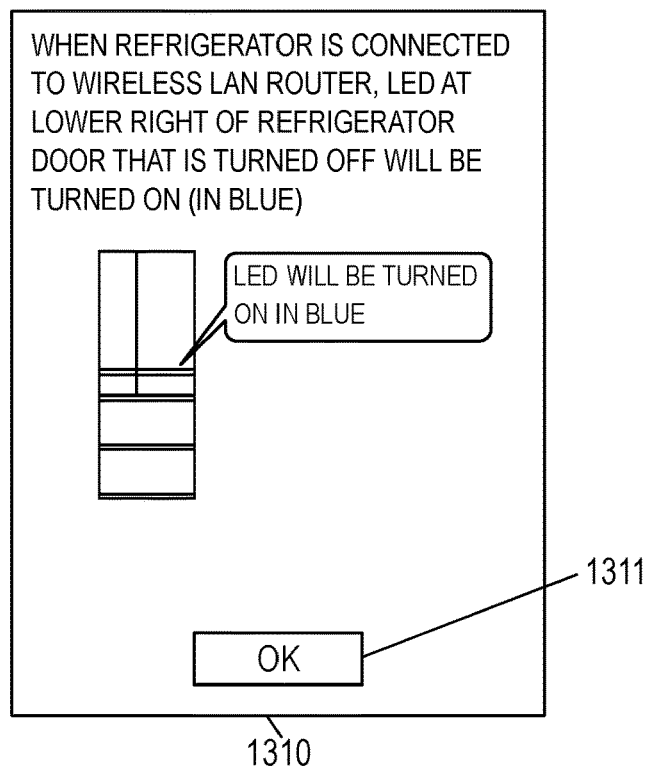
FIG. 13B is a view showing a confirmation screen displayed by portable terminal 110.

The processing executed by portable terminal 110 (see FIG. 1) will be described with reference to the flowcharts of FIGS. 8, 10, and 12. Each of the steps shown in these flowcharts is achieved through development of the control program and the refrigerator application program stored in flash memory 602 (see FIG. 6) in RAM 603 (see FIG. 6) and execution of the control program and the refrigerator application program by CPU 601 (see FIG. 6). Moreover, screens displayed by portable terminal 110 will be described with reference to FIGS. 9A to 9D, 11A to 11C, and 13A to 13B.

First, in step 801 shown in FIG. 8, refrigerator application 702 displays a screen that shows an operation method of refrigerator 100. Here, display 605 (see FIG. 6) of portable terminal 110 displays operation screen 900 of FIG. 9A. According to operation screen 900, the user can know that it is necessary to press and hold remote operation button 507 (see FIG. 5) of refrigerator 100 for 3 seconds or longer. After remote operation button 507 is pressed and held for 3 seconds or longer, refrigerator 100 makes a shift from a normal operation mode to a wireless connection mode. The normal operation mode and the wireless connection mode will be described in detail later.

Next, in step 802, refrigerator application 702 determines whether to display the next screen. When the user touches button 901 of operation screen 900, refrigerator application 702 determines to display the next screen (Yes in step 802), and the processing proceeds to step 803.

Next, in step 803, refrigerator application 702 displays a screen on which the user selects a method for connecting refrigerator 100 to an access point. Here, display 605 of portable terminal 110 displays selection screen 910 of FIG. 9B. According to selection screen 910, the user can select either a simple connection or a detailed connection as a method for connecting refrigerator 100 to an access point.

Next, in step 804, refrigerator application 702 determines whether the connection method selected by the user is the simple connection or detailed connection. When the user touches button 911 (see FIG. 9B) of selection screen 910, refrigerator application 702 determines that the connection method selected by the user is the simple connection, and the processing proceeds to step 805. On the other hand, when the user touches button 912 (see FIG. 9B) of selection screen 910, refrigerator application 702 determines that the connection method selected by the user is the detailed connection, and the processing proceeds to step 1001 of FIG. 10.

The simple connection will be described. The simple connection is a method for causing refrigerator 100 and access point 120 to simultaneously execute connection processing and thereby easily establishing a wireless connection between refrigerator 100 and access point 120. In step 805, refrigerator application 702 displays a screen that shows an operation method of refrigerator 100 and the access point necessary for the simple connection. Here, display 605 of portable terminal 110 displays operation screen 920 of FIG. 9C. According to operation screen 920, the user can know an operation necessary for the simple connection. In refrigerator 100 in the wireless connection mode, when refrigerating button 503 (see FIG. 5) of operation panel 304 (see FIG. 5) is pressed, refrigerator 100 executes the connection processing. Moreover, access point 120 also executes the connection processing at the same timing as the connection processing of refrigerator 100. Accordingly, a wireless connection is established between refrigerator 100 and access point 120. The connection processing executed by refrigerator 100 will be described in detail later.

Next, in step 806, refrigerator application 702 determines whether to display the next screen. When the user touches button 921 of operation screen 920, refrigerator application 702 determines to display the next screen (Yes in step 806), and the processing proceeds to step 807.

Next, in step 807, refrigerator application 702 displays a screen that urges the user to confirm that the refrigerator 100 is connected to the access point. Here, display 605 of portable terminal 110 displays confirmation screen 930 of FIG. 9D. According to confirmation screen 930, the user can confirm whether refrigerator 100 is connected to the access point.

Next, the detailed connection will be described. The detailed connection is a method for sending an SSID of access point 120 and a password necessary for connecting to access point 120 from portable terminal 110 to refrigerator 100 and thereby establishing a wireless connection between refrigerator 100 and access point 120. In step 1001 of FIG. 10, refrigerator application 702 displays the screen that shows the operation method of refrigerator 100. Here, display 605 of portable terminal 110 displays operation screen 1100 of FIG. 11A. According to operation screen 1100, the user can know that it is necessary to press partial button 505 (see FIG. 5) of refrigerator 100. In refrigerator 100 in the wireless connection mode, when partial button 505 of operation panel 304 is pressed, refrigerator 100 starts an operation in the soft AP mode.

Next, in step 1002, refrigerator application 702 determines whether to display the next screen. When the user touches button 1101 of operation screen 1100, refrigerator application 702 determines to display the next screen (Yes in step 1002), and the processing proceeds to step 1003.

Next, in step 1003, refrigerator application 702 determines whether portable terminal 110 is connected to an access point. In order to perform this determination, refrigerator application 702 inquires of OS 701 (see FIG. 7) about the SSID of the access point to which portable terminal 110 is connected. If the SSID of the access point to which portable terminal 110 is connected is returned from OS 701 to refrigerator application 702, refrigerator application 702 determines that portable terminal 110 is connected to the access point (Yes in step 1003), and the processing proceeds to step 1004. On the other hand, if the SSID of the access point to which portable terminal 110 is connected is not returned from OS 701 to refrigerator application 702, refrigerator application 702 determines that portable terminal 110 is not connected to the access point (No in step 1003), and the processing proceeds to step 1008.

Next, step 1004 will be described. In step 1004, refrigerator application 702 stores the SSID of the access point to which portable terminal 110 is connected. If the access point to which portable terminal 110 is connected is access point 120, refrigerator application 702 stores the SSID of access point 120. Through the processing of steps 1003 and 1004, refrigerator application 702 can acquire, from OS 701, the SSID of the access point to which portable terminal 110 is connected.

Next, in step 1005, refrigerator application 702 connects to a refrigerator in operation in the soft AP mode. Refrigerator application 702 instructs OS 701 to connect to a refrigerator in operation in the soft AP mode. Through control of OS 701, portable terminal 110 sends a connection request to the refrigerator in operation in the soft AP mode. In the present exemplary embodiment, as described in step 1001, refrigerator 100 is in operation in the soft AP mode.

Therefore, portable terminal 110 sends the connection request to refrigerator 100. As a result, the wireless connection is established between portable terminal 110 and refrigerator 100.

In order to connect portable terminal 110 to refrigerator 100 in operation in the soft AP mode, portable terminal 110 needs to specify an SSID of refrigerator 100 and a password necessary for connection. In the present exemplary embodiment, the SSID and the password of refrigerator 100 are determined in advance at a time of manufacturing refrigerator 100, and these SSID and password are incorporated in the application program of refrigerator application 702. As a result, when refrigerator application 702 is installed, portable terminal 110 can specify the SSID of refrigerator 100 and the password necessary for the connection. The user does not have to specify the SSID of refrigerator 100 on portable terminal 110 or input the password necessary for the connection in portable terminal 110. Therefore, convenience of the user is improved. Note that in a case where no password is required for connecting portable terminal 110 to refrigerator 100 in operation in the soft AP mode, only the SSID of refrigerator 100 may be incorporated in the application program of refrigerator application 702.

Next, in step 1006, refrigerator application 702 determines whether the connection to the refrigerator in operation in the soft AP mode has been successful. When refrigerator application 702 determines that the connection to the refrigerator in operation in the soft AP mode has been successful (Yes in step 1006), the processing proceeds to step 1201 of FIG. 12. On the other hand, when refrigerator application 702 determines that the connection to the refrigerator in operation in the soft AP mode has failed (No in step 1006), the processing proceeds to step 1007.

Next, step 1201 of FIG. 12 will be described. In step 1201, refrigerator application 702 displays a screen on which the user inputs a password necessary for connecting to the access point. Here, display 605 of portable terminal 110 displays password input screen 1300 of FIG. 13A. In area 1301 of password input screen 1300, the SSID (in the present exemplary embodiment, the SSID of access point 120) stored in step 1004 is displayed. The user inputs the password for connecting to the access point of the SSID displayed on password input screen 1300 in input area 1302. Note that since refrigerator application 702 cannot acquire the password from OS 701, the input of the password for connecting to the access point is received from the user.

Next, in step 1202, refrigerator application 702 determines whether the input of the password has been completed. When the user inputs the password in the input area 1302 and then touches button 1303, refrigerator application 702 determines that the input of the password has been completed (Yes in step 1202), and the processing proceeds to step 1203.

Next, in step 1203, refrigerator application 702 sends the SSID stored in step 1004 and the password input by the user to the refrigerator via the wireless connection that has been established. Refrigerator application 702 instructs OS 701 to send the SSID stored in step 1004 and the password input by the user, and the SSID and the password are sent from portable terminal 110 to the refrigerator through the control of OS 701. In the present exemplary embodiment, the SSID of access point 120 and the password necessary for connecting to access point 120 are sent to refrigerator 100. Refrigerator 100 then tries to connect to access point 120 based on the received SSID and password.

Next, in step 1204, refrigerator application 702 displays a screen that urges the user to confirm that refrigerator 100 is connected to the access point. Here, display 605 of portable terminal 110 displays confirmation screen 1310 of FIG. 13B. According to confirmation screen 1310, the user can confirm whether refrigerator 100 is connected to the access point.

Next, in step 1205, refrigerator application 702 determines whether to return the connection destination of portable terminal 110 to an original access point. When the user touches button ("OK" button) 1311 of confirmation screen 1310, or a predetermined time (for example, 5 minutes) has passed while confirmation screen 1310 is displayed, refrigerator application 702 determines to return the connection destination of portable terminal 110 to the original access point (Yes in step 1205), and the processing proceeds to step 1206.

Next, in step 1206, refrigerator application 702 returns the connection destination of portable terminal 110 to the original access point. Refrigerator application 702 instructs OS 701 to connect to the access point of the SSID stored in step 1004, and the connection destination of portable terminal 110 is returned to the original access point through the control of OS 701. In the present exemplary embodiment, the connection destination of portable terminal 110 is returned from refrigerator 100 to access point 120.

In the present exemplary embodiment, as following the procedures of the detailed connection, the connection destination of portable terminal 110 is changed from access point 120 to refrigerator 100. There is a problem in which, while portable terminal 110 is connected to refrigerator 100, the user cannot use portable terminal 110 as usual. In the present exemplary embodiment, through the processing of step 1206, the connection destination of portable terminal 110 can be returned to access point 120, and thus the convenience of the user is improved.

Figure 10:
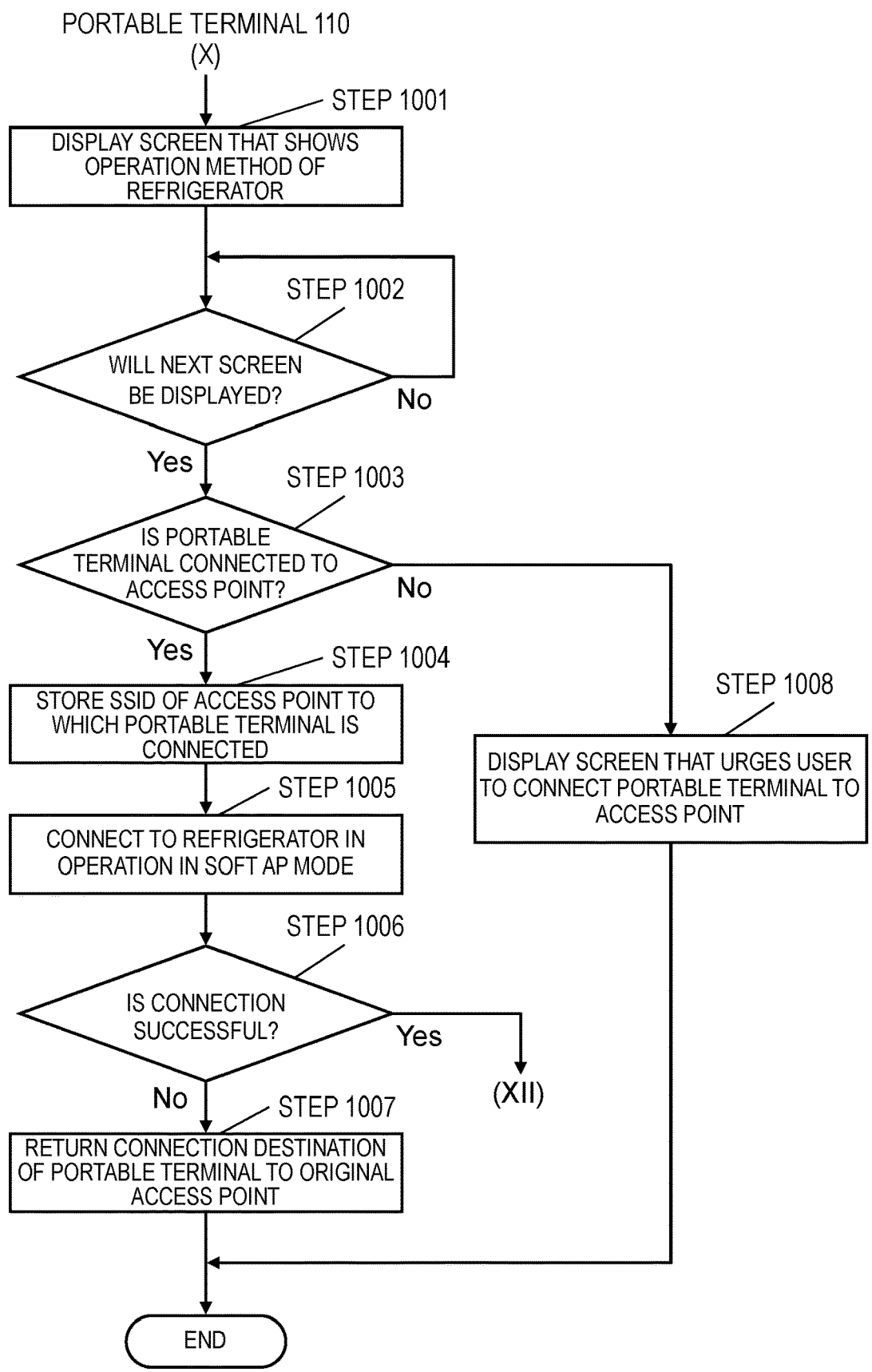
FIG. 10 is a flowchart showing processing executed by portable terminal 110.
Figure 11A:
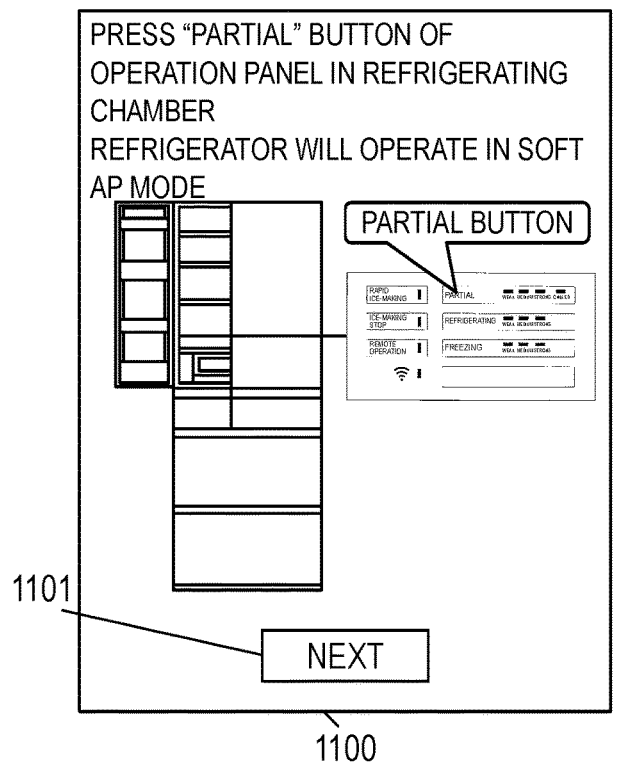
FIG. 11A is a view showing an operation screen displayed by portable terminal 110.
Figure 11B:
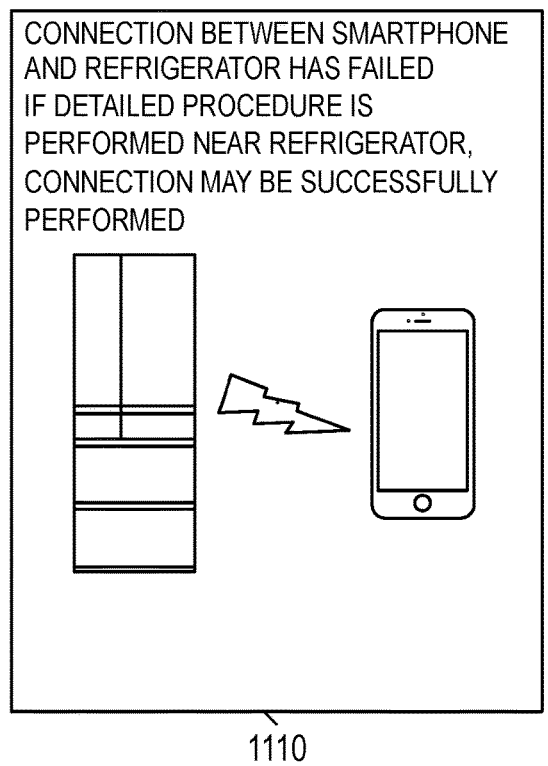
FIG. 11B is a view showing an error screen displayed by portable terminal 110.
Figure 11C:
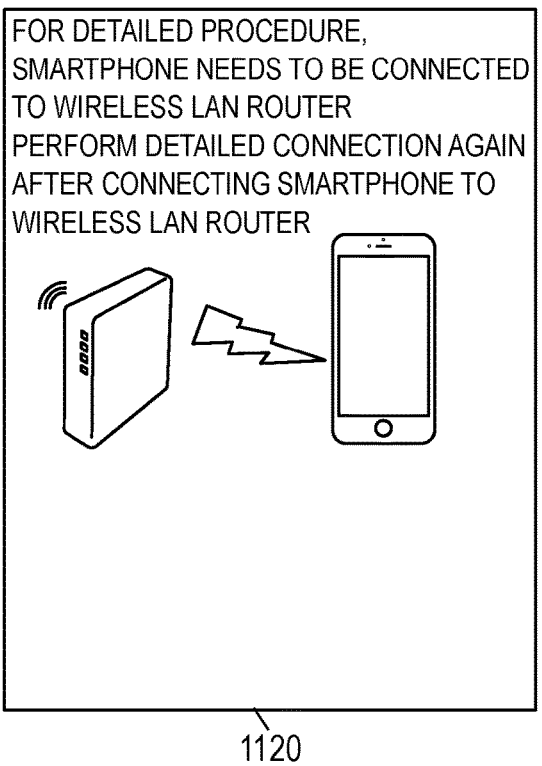
FIG. 11C is a view showing another error screen displayed by portable terminal 110.

Next, the description is returned to the flowchart of FIG. 10, and the processing is described in a case where, in step 1006, it has been determined that the connection to the refrigerator in operation in the soft AP mode has been failed (No in step 1006). In step 1007, refrigerator application 702 returns the connection destination of portable terminal 110 to the original access point. Refrigerator application 702 instructs OS 701 to connect to the access point of the SSID stored in step 1004, and the connection destination of portable terminal 110 is returned to the original access point through the control of OS 701. When portable terminal 110 cannot be connected to refrigerator 100 in operation in the soft AP mode, the detailed connection cannot be continued. Therefore, in the present exemplary embodiment, the connection destination of portable terminal 110 is returned to access point 120 to which portable terminal 110 has been originally connected, and thus the convenience of the user is improved. Moreover, in step S1007, refrigerator application 702 may display error screen 1110 of FIG. 11B. When the user who has confirmed error screen 1110 performs the detailed connection again near refrigerator 100, portable terminal 110 may be successfully connected to refrigerator 100 in operation in the soft AP mode.

Next, the processing is described is a case where, in step 1003, it has been determined that portable terminal 110 is not connected to an access point (No in step 1003). In step 1008, refrigerator application 702 displays a screen that urges the user to connect portable terminal 110 to an access point. Here, display 605 of portable terminal 110 displays confirmation screen 1120 of FIG. 11C. In order to perform the detailed connection, portable terminal 110 needs to be connected to an access point. After confirming confirmation screen 1120, the user can know that portable terminal 110 needs to be connected to an access point.

Figure 14:
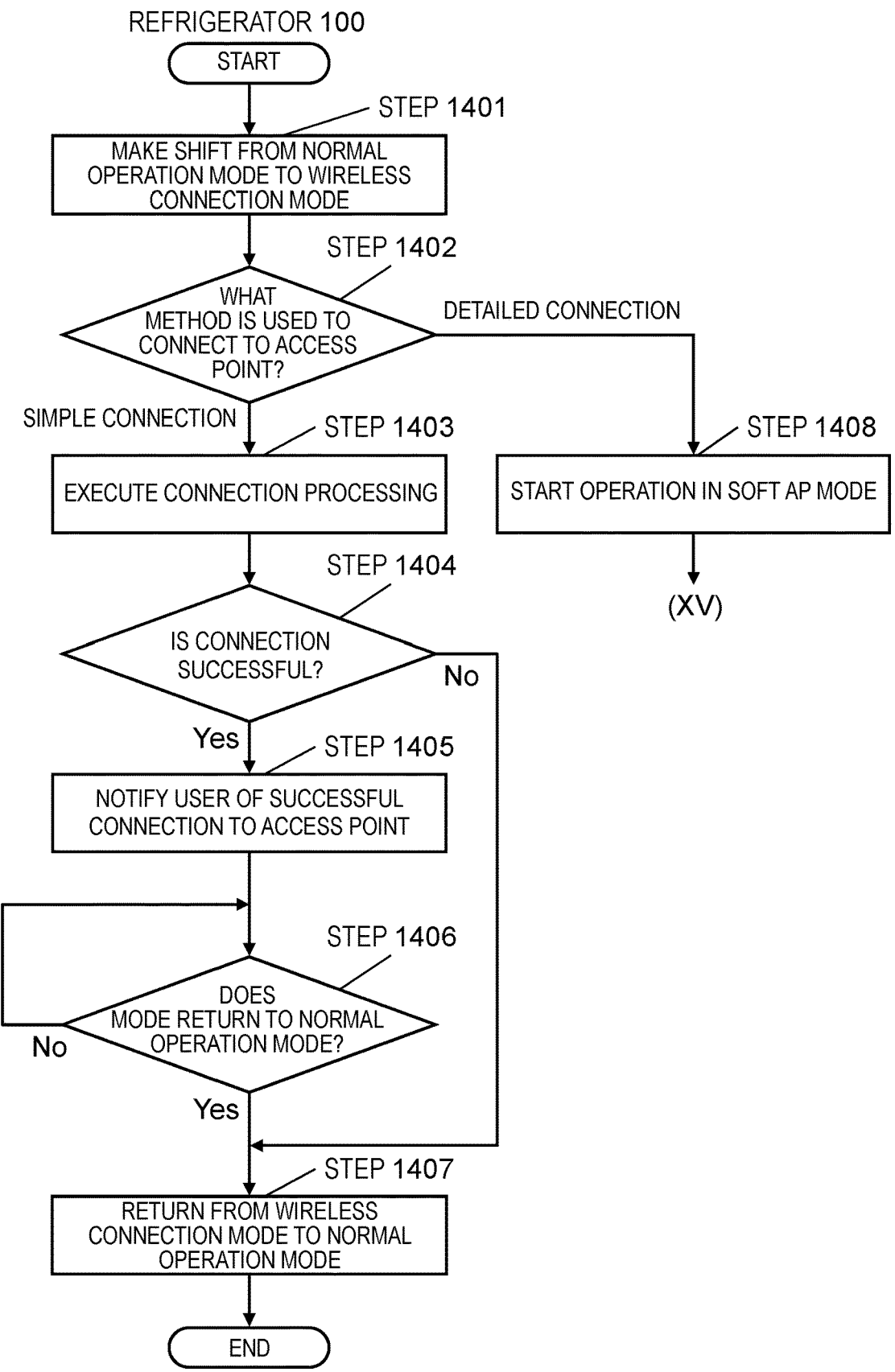
FIG. 14 is a flowchart showing processing executed by refrigerator 100.

Next, the processing executed by refrigerator 100 will be described with reference to the flowcharts of FIGS. 14 and 15. Each of the steps shown in these flowcharts is achieved through development of the control program stored in ROM 302 (see FIG. 3) in RAM 303 (see FIG. 3) and execution of the control program by CPU 301 (see FIG. 3).

Figure 9A:
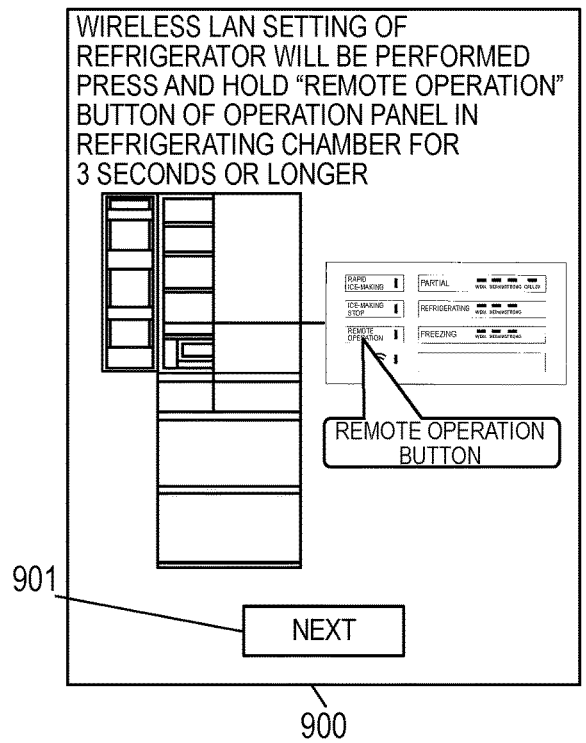
FIG. 9A is a view showing an operation screen displayed by portable terminal 110.
Figure 9B:
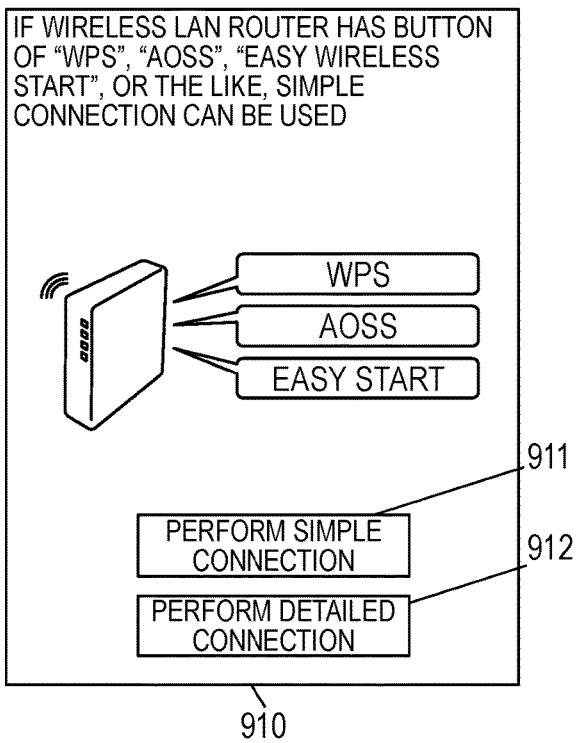
FIG. 9B is a view showing a selection screen displayed by portable terminal 110.
Figure 9C:
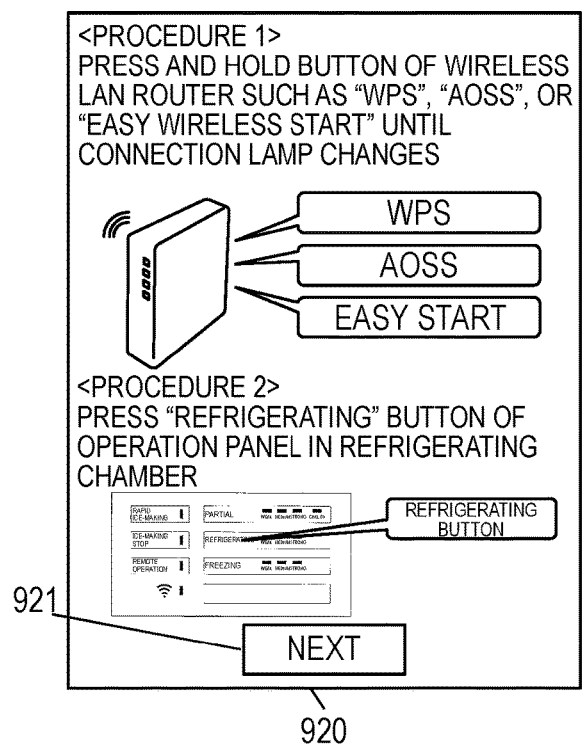
FIG. 9C is a view showing another operation screen displayed by portable terminal 110.
Figure 9D:
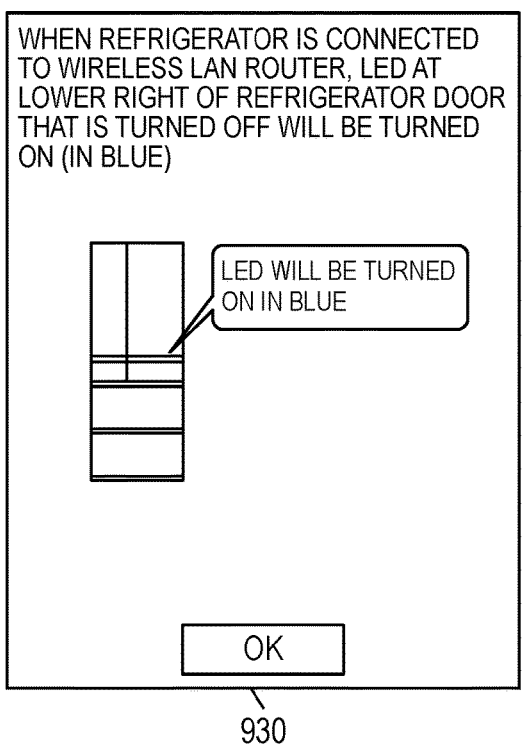
FIG. 9D is a view showing a confirmation screen displayed by portable terminal 110.

When the user who has confirmed operation screen 900 of FIG. 9A presses and holds remote operation button 507 of operation panel 304 for 3 seconds or longer, in step 1401, refrigerator 100 makes a shift from the normal operation mode to the wireless connection mode. The normal operation mode is a mode in which refrigerator 100 performs a normal operation such as a cooling operation based on the temperature of each storage compartment including refrigerating chamber 201, and freezing chambers 203, 204, and a defrosting operation by a defrosting heater. On the other hand, the wireless connection mode is a mode in which refrigerator 100 connects to an access point through the simple connection or detailed connection.

Next, in step 1402, refrigerator 100 determines whether the connection method to the access point is the simple connection or detailed connection. When the user who has confirmed operation screen 920 of FIG. 9C presses refrigerating button 503 of operation panel 304, refrigerator 100 determines to perform the simple connection, and the processing proceeds to step 1403. On the other hand, when the user who has confirmed operation screen 1100 of FIG. 11A presses partial button 505 of operation panel 304, refrigerator 100 determines to perform the detailed connection, and the processing proceeds to step 1408.

The function of each button of operation panel 304 described in FIG. 5 is applicable when refrigerator 100 is in operation in the normal operation mode, and not applicable when refrigerator 100 is in operation in the wireless connection mode. For example, refrigerating button 503 is used as a button for adjusting the temperature of refrigerating chamber 201 in the normal operation mode. However, refrigerating button 503 is not used as a button for adjusting the temperature of refrigerating chamber 201 in the wireless connection mode. In the wireless connection mode, refrigerating button 503 is used as a button for inputting, into refrigerator 100, an instruction for connecting refrigerator 100 to an access point by the user. Moreover, similar to refrigerating button 503, in the wireless connection mode, partial button 505 is also used as a button for inputting, into refrigerator 100, an instruction for connecting refrigerator 100 to an access point by the user. Since a button that is used in the normal operation mode, for example, refrigerating button 503, which adjusts the temperature of the storage compartment, is also used in the wireless connection mode, adding a new button for the wireless connection mode is not necessary. Moreover, even when a new button is added for the operation in the wireless connection mode, a number of buttons to be added can be reduced. Note that, instead of the button, which adjusts the temperature of the storage compartment, such as refrigerating button 503, a button related to an ice-making function such as rapid ice-making button 501 may be used as a button for inputting the instruction to connect refrigerator 100 to the access point into refrigerator 100 by the user.

Next, the simple connection will be described. In step 1403, refrigerator 100 executes the connection processing of the simple connection. Refrigerator 100 executes search processing according to each system of Wi-Fi Protected Setup (WPS) (registered trademark), AirStation One-Touch Secure System (AOSS) (registered trademark), and "raku raku musen start (easy wireless start)" (registered trademark) in a time division manner or in parallel. When refrigerator 100 then finds an access point that is operating in any system of WPS, AOSS, and easy wireless start at the same timing, refrigerator 100 establishes a wireless connection between the found access point and refrigerator 100.

Next, in step 1404, refrigerator 100 determines whether the connection to the access point has been successful. When a wireless connection is established between refrigerator 100 and the access point through the connection processing in step 1403, refrigerator 100 determines that the connection to the access point has been successful (Yes in step 1404), and the processing proceeds to step 1405. On the other hand, in a case where no wireless connection has been established between refrigerator 100 and the access point even after the connection processing in step 1403 has started and a predetermined time (for example, 2 minutes) has passed, refrigerator 100 determines that the connection to the access point has failed (No in step 1404), and the processing proceeds to step 1407.

Next, in step 1405, refrigerator 100 notifies the user of the successful connection to the access point. In the door of refrigerating chamber 201 (see FIG. 2) of refrigerator 100, a lighting apparatus such as a light emitting diode (LED) is provided. By lighting this LED in a predetermined color (for example, blue), refrigerator 100 notifies the user of the successful connection to the access point. Note that the method for notifying the user of the connection to the access point is not limited to lighting of a lighting apparatus such as an LED. Alternatively, refrigerator 100 may outputs a voice message that notifies the user of the successful connection to the access point. Alternatively, through an instruction by refrigerator 100 to a predetermined smart speaker to output a voice message that notifies the user of the successful connection to the access point, the smart speaker may output the voice message.

Next, in step 1406, refrigerator 100 determines whether to return from the wireless connection mode to the normal operation mode. After a predetermined time (for example, 1 minute) has passed since the processing in step 1405 has been executed, refrigerator 100 determines to return to the normal operation mode from the wireless connection mode (Yes in step 1406), and the processing proceeds to step 1407.

Next, in step 1407, refrigerator 100 returns from the wireless connection mode to the normal operation mode. Note that also in a case where refrigerator 100 determines that the connection to the access point has failed in step 1404, the processing proceeds to step 1407, and the mode of refrigerator 100 returns from the wireless connection mode to the normal operation mode.

Next, the detailed connection will be described. In step 1408, refrigerator 100 starts the operation in the soft AP mode. The SSID of refrigerator 100 that operates in the software AP mode, and a password for connecting an external apparatus to refrigerator 100 in operation in the software AP mode are determined in advance at the time of manufacturing refrigerator 100. Moreover, these SSID and password match the ones that have been incorporated in the application program of refrigerator application 702 in advance. Note that when the external apparatus is connected to refrigerator 100 in operation in the soft AP mode, an operation that requires no password is also possible. In the case of this operation, only the SSID of refrigerator 100 may be incorporated in the application program of refrigerator application 702 in advance.

Next, in step 1501 of FIG. 15, refrigerator 100 determines whether refrigerator 100 has received a connection request to refrigerator 100 that operates in the soft AP mode from the external apparatus. In the present exemplary embodiment, portable terminal 110 sends a connection request to refrigerator 100 that operates in the soft AP mode (see step 1005 of FIG. 10). After refrigerator 100 receives the connection request (Yes in step 1501), the processing proceeds to step 1502. On the other hand, in a case where no connection request has been generated to refrigerator 100 that operates in the soft AP mode for a predetermined time (for example, 2 minutes) since the operation in the soft AP mode has started (No in step 1501), the processing proceeds to step 1508.

Next, in step 1502, refrigerator 100 establishes a wireless connection between refrigerator 100 and the external apparatus that is a transmission source of the connection request. In the present exemplary embodiment, the wireless connection is established between refrigerator 100 and portable terminal 110.

Next, in step 1503, refrigerator 100 determines whether refrigerator 100 has received an SSID of the access point and a password for connecting to the access point from the external apparatus that is connected to refrigerator 100. In the present exemplary embodiment, portable terminal 110 sends, to refrigerator 100, the SSID of access point 120 and the password for connecting to access point 120 (see step 1203 of FIG. 12). After refrigerator 100 receives the SSID of the access point and the password for connecting to the access point from the external apparatus (Yes in step 1503), the processing proceeds to step 1504. On the other hand, in a case where refrigerator 100 has not received the SSID of the access point and the password for connecting to the access point for a predetermined time (for example, 2 minutes) since the wireless connection has been established between refrigerator 100 and the external apparatus (No in step 1503), the processing proceeds to step 1508.

Next, in step 1504, refrigerator 100 connects to the access point based on the received SSID and password from the external apparatus. In the present exemplary embodiment, refrigerator 100 establishes a wireless connection between refrigerator 100 and access point 120.

Next, in step 1505, refrigerator 100 determines whether the connection to the access point has been successful. When refrigerator 100 determines that the connection to the access point has been successful (Yes in step 1505), the processing proceeds to step 1506. On the other hand, when refrigerator 100 determines that the connection to the access point has failed (No in step 1505), the processing proceeds to step 1508.

Next, in step 1506, refrigerator 100 notifies the user of the successful connection to the access point. The processing in step 1506 is the same as the processing described in step 1405 of FIG. 14. Note that unlike step 1405, in step 1506, refrigerator 100 establishes a wireless connection not only between refrigerator 100 and access point 120, but also between refrigerator 100 and portable terminal 110. Therefore, refrigerator 100 may notify refrigerator application 702 of portable terminal 110 of the successful connection to the access point, and refrigerator application 702 that has received the notification may display, in display 605, the successful connection of refrigerator 100 to the access point.

Next, in step 1507, refrigerator 100 determines whether the mode of refrigerator 100 returns from the wireless connection mode to the normal operation mode. In a case where a predetermined time (for example, 1 minute) has passed since the processing in step 1506 has been executed, or in a case where the wireless connection between refrigerator 100 and portable terminal 110 is cut, refrigerator 100 determines that the mode of the refrigerator 100 returns to the normal operation mode from the wireless connection mode (Yes in step 1507), and the processing proceeds to step 1508.

Next, in step 1508, the mode of refrigerator 100 returns from the wireless connection mode to the normal operation mode. Moreover, in step 1508, refrigerator 100 ends the operation in soft AP mode. Note that also in a case where refrigerator 100 determines that refrigerator 100 does not receive the connection request from the external apparatus in step 1501 (No in step 1501), the processing proceeds to step 1508, and the mode of refrigerator 100 returns from the wireless connection mode to the normal operation mode. Moreover, also in a case where refrigerator 100 determines that refrigerator 100 does not receive the SSID and the password in step 1503 (No in step 1503), the processing proceeds to 1508, and the mode of refrigerator 100 returns from the wireless connection mode to the normal operation mode. Moreover, also in a case where refrigerator 100 determines that the connection to the access point has failed in step 1505 (No in step 1505), the processing proceeds to step 1508, and the mode of refrigerator 100 returns from the wireless connection mode to the normal operation mode.

As described above, in the procedure of the detailed connection, refrigerator application 702 of portable terminal 110 sends, to refrigerator 100, the SSID of access point 120 and the password for connecting to access point 120. Refrigerator 100 then establishes a wireless connection between refrigerator 100 and access point 120 based on the received SSID and password. As a result, even when the user does not specify access point 120 of the connection destination of refrigerator 100 in refrigerator 100, a wireless connection can be established between refrigerator 100 and access point 120.

The system of the present exemplary embodiment includes a portable terminal and a communication device. The portable terminal includes a means for specifying an SSID of an access point to which the portable terminal is connected, and a means for receiving an input of a password for connecting to the access point from a user, a first means for establishing a wireless connection between the portable terminal and the communication device in operation in a software access point mode, and a means for sending, to the communication device, the SSID specified by the specifying means and the password received by the received means via the wireless connection.

The communication device includes a means for starting an operation in the software access point mode in response to an instruction from the user, and a second means for establishing a wireless connection between the communication device and the access point based on the SSID and password sent by the communication device by the sending means. In the present exemplary embodiment, the communication device is, for example, is a refrigerator.

Moreover, the program of the present exemplary embodiment is a program of an application installed in the portable terminal. The program acquires an SSID of an access point to which the portable terminal is connected from an OS of the portable terminal, receives an input of the password for connecting to the access point from the user, changes the connection destination of the portable terminal to the communication device in operation in the software access point mode, and sends the SSID acquired from the OS and the password received from the user to the communication device.

Note that the SSID necessary for connecting to the communication device in operation in the software access point mode may be incorporated in the program of the application in advance.

Note that the SSID and password necessary for connecting to the communication device in operation in the software access point mode may be incorporated in the program of the application in advance.

The application may be an application for a refrigerator. Moreover, the communication device may be a refrigerator.

According to the present exemplary embodiment, even when a user does not specify an access point of a connection destination of a communication device in the communication device, a wireless connection can be established between the communication device and the access point.

(Modifications)

The connection method for establishing a wireless connection between refrigerator 100 and access point 120 described in the above exemplary embodiment is also applicable to another communication device that includes a wireless LAN communication function. For example, the connection method for establishing a wireless connection described in the exemplary embodiment above is applicable to a communication device of a washing machine, an air conditioner, a microwave oven, a rice cooker, a dish washing and drying machine, a digital camera, a printing apparatus, and the like each of which includes a wireless LAN communication function.

REFERENCE MARKS IN THE DRAWINGS

100: refrigerator
110: portable terminal
120: access point
201: refrigerating chamber
202: ice-making chamber
203: upper freezing chamber
204: lower freezing chamber
205: vegetable chamber
301: CPU
302: ROM
303: RAM
304: operation panel
305: wireless LAN I/F
401: hinge cover
501: rapid ice-making button
502: ice-making stop button
503: refrigerating button
504: freezing button
505: partial button
506: display
601: CPU
602: flash memory
603: RAM
604: operation unit
605: display
606: wireless LAN I/F
607: camera
701: OS
702: refrigerator application

The invention claimed is:

1. A control method that is achieved by an application installed in a portable terminal, the control method comprising the steps of:
   determining whether the portable terminal is connected to an access point;

storing a service set identifier (SSID) of the access point and connecting the portable terminal to a communication device in operation in a software access point mode; when it is determined that the portable terminal is connected to the access point determining whether connecting the portable terminal to the communication device is successful;

displaying a password input screen that urges a user to input a password to connect to the access point when it is determined that connecting the portable terminal to the communication device is successful; and sending the SSID stored in the step of storing and the password input through the password input screen to the communication device, wherein in the step of connecting, the application instructs an operating system (OS) of the portable terminal to connect the portable terminal to the communication device in operation in the software access point mode; and a SSID of the communication device that operates in the software access point mode, and a password for connecting to the communication device that operates in the software access point mode are incorporated in a program of the application in advance of installation of the application to the portable terminal, the control method further comprising the step of:

returning a connection destination of the portable terminal to the access point when it is determined that connecting the portable terminal to the communication device is failed.

2. The control method according to claim 1, wherein the SSID stored in the step of storing is displayed on the password input screen.

3. The control method according to claim 1, the control method further comprising the step of:

when it is determined that the connecting the portable terminal to the communication device is failed,
displaying an error screen that urges the user to perform connecting again near the communication device; and
returning connection destination of the portable terminal to the access point.

4. The control method according to claim 1, the control method further comprising the step of:

displaying a screen that urges the user to connect the portable terminal to an access point when it is determined that the portable terminal is not connected to any access point.

* * * * *